US007986981B2

(12) United States Patent
Jin et al.

(10) Patent No.: US 7,986,981 B2
(45) Date of Patent: Jul. 26, 2011

(54) PORTABLE TERMINAL WITH ROTATABLE DISPLAY

(75) Inventors: Jae-Chul Jin, Suwon-si (KR); Ki-Taek Kim, Yongin-si (KR); Jin-Soo Kim, Suwon-si (KR); Young-Ki Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 798 days.

(21) Appl. No.: 12/019,134

(22) Filed: Jan. 24, 2008

(65) Prior Publication Data

US 2008/0188269 A1 Aug. 7, 2008

(30) Foreign Application Priority Data

Feb. 2, 2007 (KR) .................. 10-2007-0011093

(51) Int. Cl.
*H04B 1/38* (2006.01)
*H04M 1/00* (2006.01)
(52) U.S. Cl. .................. 455/575.1; 455/550.1; 455/90.3
(58) Field of Classification Search .............. 455/550.1, 455/566, 567, 575.1, 575.3, 575.4, 90.3
See application file for complete search history.

(56) References Cited

U.S. PATENT DOCUMENTS

| | | | | |
|---|---|---|---|---|
| 6,009,336 A * | 12/1999 | Harris et al. | .................. | 455/566 |
| 6,011,699 A * | 1/2000 | Murray et al. | ................. | 361/814 |
| 6,192,258 B1 * | 2/2001 | Kamada et al. | ................ | 455/566 |
| 6,657,654 B2 * | 12/2003 | Narayanaswami | ........ | 348/14.04 |
| 6,728,557 B1 * | 4/2004 | Tracy et al. | ................. | 455/575.3 |
| 6,751,487 B1 * | 6/2004 | Rydbeck et al. | ........... | 455/575.3 |
| 6,813,143 B2 * | 11/2004 | Makela | ..................... | 361/679.08 |
| 7,045,286 B2 * | 5/2006 | Greene et al. | ..................... | 435/6 |
| 7,113,220 B1 * | 9/2006 | Misawa et al. | ................. | 348/376 |
| 7,148,911 B1 * | 12/2006 | Mitsui et al. | ................ | 348/14.01 |
| 7,174,195 B2 * | 2/2007 | Nagamine | .................. | 455/575.1 |
| 7,212,844 B2 * | 5/2007 | Gordecki | ................... | 455/575.1 |
| 7,239,898 B2 * | 7/2007 | Lenchik et al. | ............ | 455/575.1 |
| 7,499,737 B2 * | 3/2009 | Mizuta et al. | ............. | 455/575.3 |
| 7,542,781 B2 * | 6/2009 | Murata | ..................... | 455/556.1 |
| 7,865,219 B2 * | 1/2011 | Abe | ........................... | 455/575.3 |

FOREIGN PATENT DOCUMENTS

KR 1020060086735 8/2006

* cited by examiner

*Primary Examiner* — Tilahun Gesesse
(74) *Attorney, Agent, or Firm* — The Farrell Law Firm, P.C.

(57) ABSTRACT

A portable terminal is disclosed. The portable terminal includes a first housing having a face in which a mounting unit is formed and a second housing combined with the mounting unit in order to rotate while facing the first housing, in which upon 90° clockwise or counterclockwise rotation of the second housing disposed in the longitudinal direction of the first housing, one of two side faces of the second housing closely contacts a sidewall of the mounting unit and a lower cross-section of the second housing is as aligned with one of two side faces of the first housing. In the portable terminal, the display device from its longitudinal position can be rotated clockwise or counterclockwise and the shapes of the housings are maintained rectangular, thereby sufficiently securing the size of the display device.

17 Claims, 10 Drawing Sheets

PORTABLE TERMINAL WITH ROTATABLE DISPLAY

PRIORITY

This application claims the benefit under 35 U.S.C. §119(a) of a Korean Patent Application filed in the Korean Intellectual Property Office on Feb. 2, 2007 and assigned Serial No. 2007-11093, the entire disclosure of which is hereby incorporated by reference.

BACKGROUND OF THE INVENTION

1. Field of the Invention

The present invention generally relates to a portable terminal, and in particular, to a portable terminal in which a pair of housing can rotate while facing each other.

2. Description of the Related Art

Generally, portable terminals may be classified into bar-type terminals, flip-type terminals, and folder-type terminals according to their appearance. In the bar-type terminal, a transmitting unit (or a mouthpiece), a receiving unit (or an earpiece), a keypad, and a display device are mounted in a single housing. Since a keypad as a data input unit is exposed at all times, the bar-type terminal is likely to malfunction. Moreover, there is a limitation on miniaturization of the bar-type terminal because a sufficient distance should be maintained between the transmitting unit and the receiving unit.

The flip-type terminal includes a main body, a flip, and a hinge module that combines the main body with the flip. In the flip-type terminal, the transmitting unit, the receiving unit, the keypad, and the display device are mounted in the main body and malfunctioning can be reduced by the flip that covers a keypad as a data input unit. However, there is also a limitation on miniaturization of the flip-type terminal because a sufficient distance should be maintained between the transmitting unit and the receiving unit.

The folder-type terminal includes a main body, a folder, and a hinge module that rotatably combines the main body with the folder. The folder is opened and closed by rotation. When the folder is folded on the main body, it is possible to prevent a keypad from malfunctioning through a call wait mode. When the folder is opened in a call mode, a sufficient distance can be secured between the transmitting unit and the receiving unit, contributing to miniaturization of the terminal.

A mobile communication service using a portable terminal has expanded its range from voice communication and short message transmission to an entertainment service such as games and ring tones and a multimedia service such as moving pictures and on-demand audio/video. At present, terrestrial/satellite Digital Multimedia Broadcasting (DMB) can be provided through a portable terminal and a portable terminal having a display device that is rotatable from its longitudinal position to its latitudinal position is provided in order to allow users to conveniently enjoy moving pictures or a broadcasting service.

In order to prevent a housing from being interfered with by another housing during rotation of the display device, some corners of the housing are formed curved, causing a need to reduce the size of the display device.

SUMMARY OF THE INVENTION

An aspect of the present invention is to address at least the above problems and/or disadvantages and to provide at least the advantages described below. Accordingly, an aspect of the present invention is to provide a portable terminal in which a display device from its longitudinal position can be rotated clockwise or counterclockwise in order to facilitate a rotation operation with respect to the display device.

Another aspect of the present invention is to provide a portable terminal in which the shapes of housings are maintained rectangular while enabling rotation of a display device, thereby sufficiently securing the size of the display device.

According to one aspect of the present invention, there is provided a portable terminal including a first housing having a face in which a mounting unit is formed and a second housing combined with the mounting unit in order to rotate while facing the first housing, wherein after a 90° clockwise or counterclockwise rotation of the second housing from its longitudinal position, one of two side faces of the second housing closely contacts a sidewall of the mounting unit and a lower cross-section of the second housing is aligned with one of two side faces of the first housing.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF THE EXEMPLARY EMBODIMENT

The matters defined in the description such as a detailed construction and elements are provided to assist in a comprehensive understanding of an exemplary embodiment of the invention. Accordingly, those of ordinary skill in the art will recognize that various changes and modifications of the embodiment described herein can be made without departing from the scope and spirit of the invention. Also, descriptions of well-known functions and constructions are omitted for clarity and conciseness. Throughout the drawings, the same drawing reference numerals will be understood to refer to the same elements, features and structures.

As shown in FIGS. 1 to 4, the portable terminal 100 according to an exemplary embodiment of the present invention includes a first housing 101 and a second housing 102 that is combined with the first housing 101 and rotates while facing the first housing 101. A mounting unit 115 for combining the first housing 101 with the second housing 102 is formed in one face of the first housing 101, and a plane sidewall are formed in the mounting unit 115. A lower cross-section of the second housing 102 disposed in the longitudinal direction of the first housing 101 closely contacts the sidewall of the mounting unit 115. In this state, the second housing 102 can rotate selectively clockwise or counterclockwise.

When the second housing 102 disposed in the longitudinal direction of the first housing 101 gradually rotates clockwise or counterclockwise, the lower cross-section of the second housing 102 moves out of the close contact with the sidewall of the mounting unit 115 and one of corners of two side faces of the lower cross-section linearly moves near the sidewall of the mounting unit 115 or slides while contacting the sidewall of the mounting unit 115. If the second housing 102 rotates 90° clockwise or counterclockwise, one of two side faces of the second housing 102 closely contacts the sidewall of the mounting unit 115 and the lower cross-section of the second housing 102 is aligned with the one of the two side faces of the second housing 102.

Figure 1:
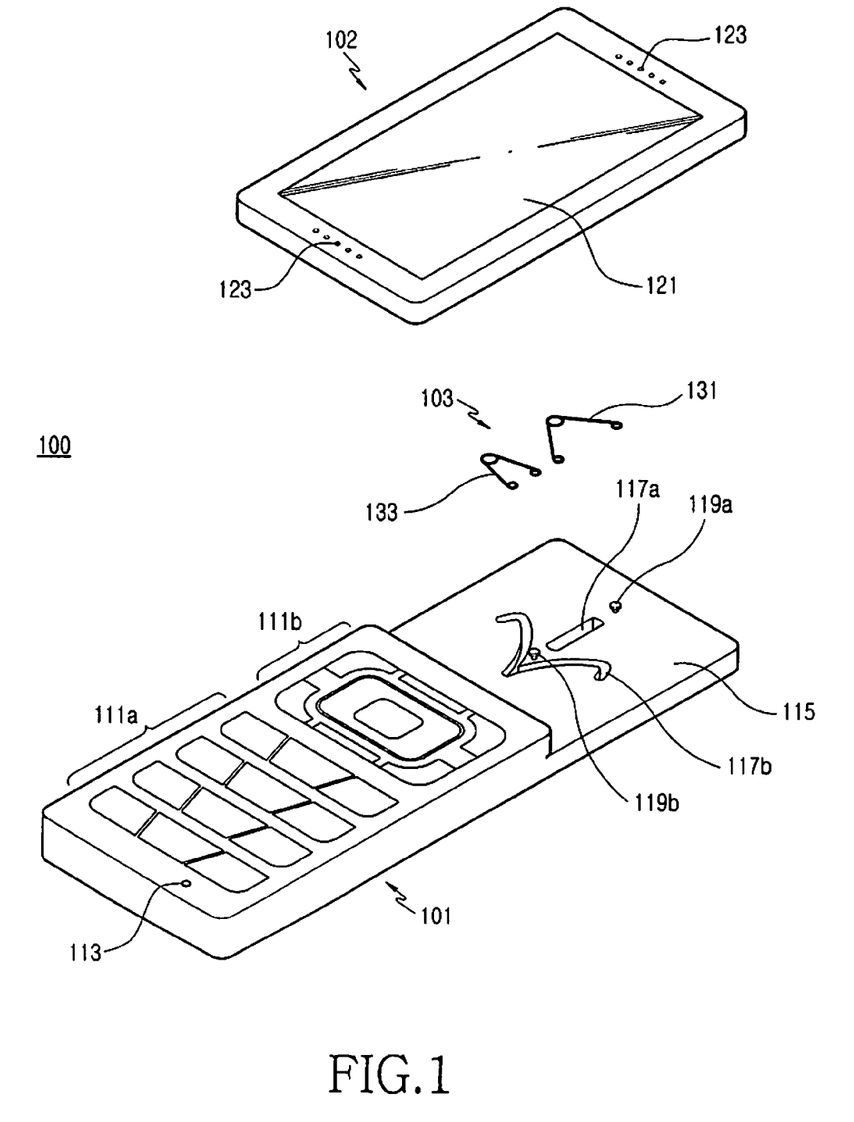
FIG. 1 is an exploded perspective view of a portable terminal according to an exemplary embodiment of the present invention.

A keypad 111a, a function keypad 111b, and a microphone 113 are installed in one face of the first housing 101 and the mounting unit 115 is formed in an upper portion with respect to the one face of the first housing 101. The mounting unit 115 is formed depressed lower than the one face in which the keypad 111a, the function keypad 111b, and the microphone 113 are installed. The mounting unit 115 formed depressed in the first housing 101 includes the sidewall formed by a height difference, and thus the sidewall of the mounting unit 115 serves as a boundary between the mounting unit 115 and the one face in which the keypad 111a, the function keypad 111b, and the microphone 113 are installed.

The keypad 111a is composed of a plurality of keys, each of the keys has an assigned signal value printed on its one face. By manipulating the keypad 111a, a number or a character is input. The function keypad 111b is composed of a menu key, a search key, and a send/end key. The microphone 113 is installed adjacent to the keypad 111a and thus user's voice to be transmitted to a user's partner is input to the microphone 113.

A display device 121 and speakers 123 are installed in the second housing 102. The display device 121 is composed of various display components such as a Liquid Crystal Display (LCD) or a Thin Film Transistor (TFT), and displays terminal state information such as transmission/reception sensitivity and the remaining battery capacity, data transmission/reception information, a received short message, and a value input by manipulation with respect to the keypads 111a and 111b. The display device 121 also outputs moving pictures or broadcasting according to an operation mode of the portable terminal 100.

The speakers 123 are installed at both sides of the second housing 102 in adjacent to the display device 121 for audio output including voice received in the portable terminal 100, audio of a music file being played, and audio of a moving picture or a broadcasting service. The speakers 123 also allow a user to perform voice communication with a user's partner using the portable terminal 100 as a combination with the microphone 113.

Since the second housing 102 is combined with the first housing 101 such that it can rotate while facing the first housing 101, the display device 121 can output a vertically long screen or a horizontally wide screen.

Figure 2:
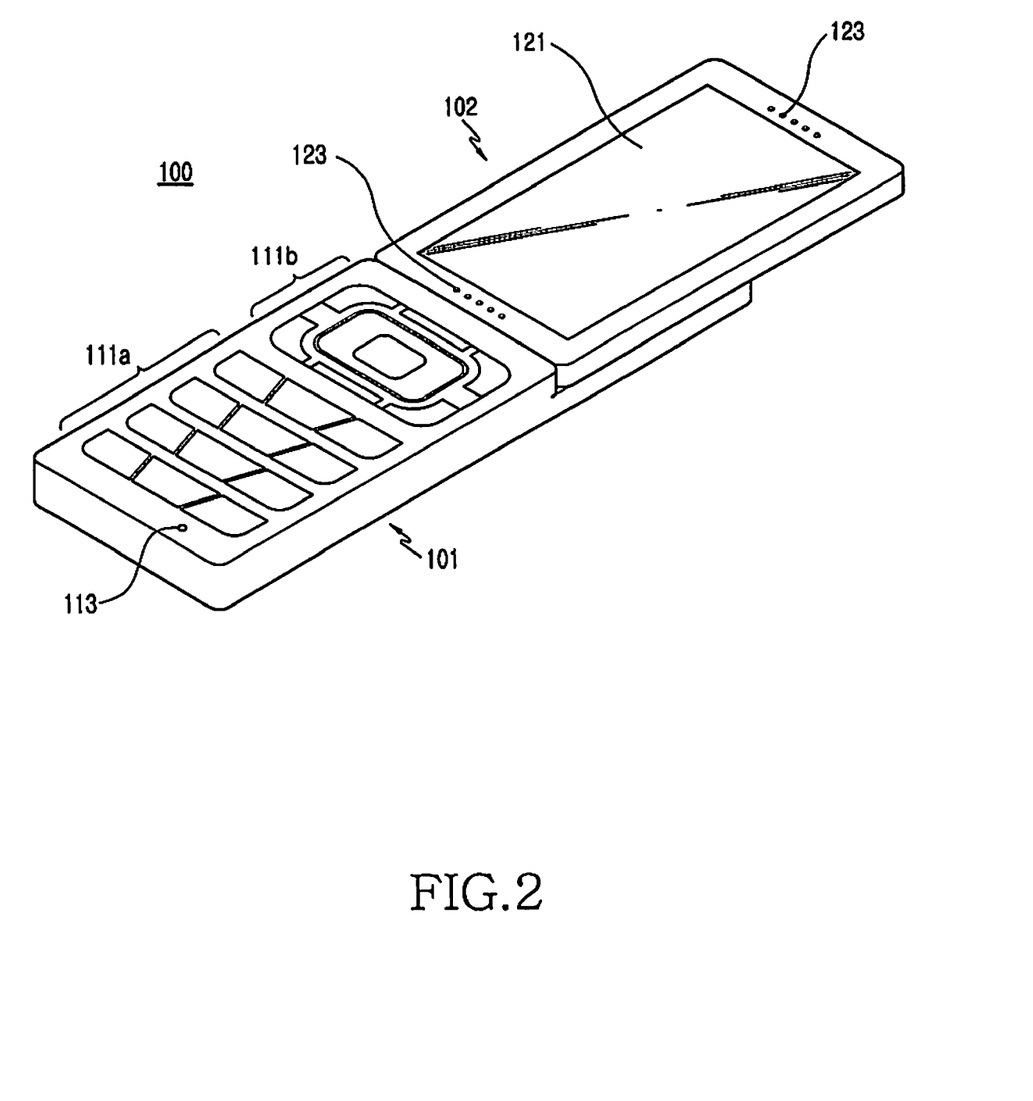
FIG. 2 is an assembled perspective view of the portable terminal shown in FIG. 1.

Referring to FIG. 2, when the second housing 102 is longitudinally aligned with the first housing 101, the display device 121 outputs a vertically long screen. When the display device 121 outputs a vertically long screen, the portable terminal 100 is set to a mode that allows voice communication, short message generation, and wireless Internet connection. Thus, in this state, the display device 121 displays terminal state information, a received message, and a value input by user's manipulation with respect to the keypad 111a. At this time, the speaker 123 in an upper portion of the second housing 102 operates, and the speaker 123 in a lower portion of the second housing 102 operates according to user's selection.

Figure 3:
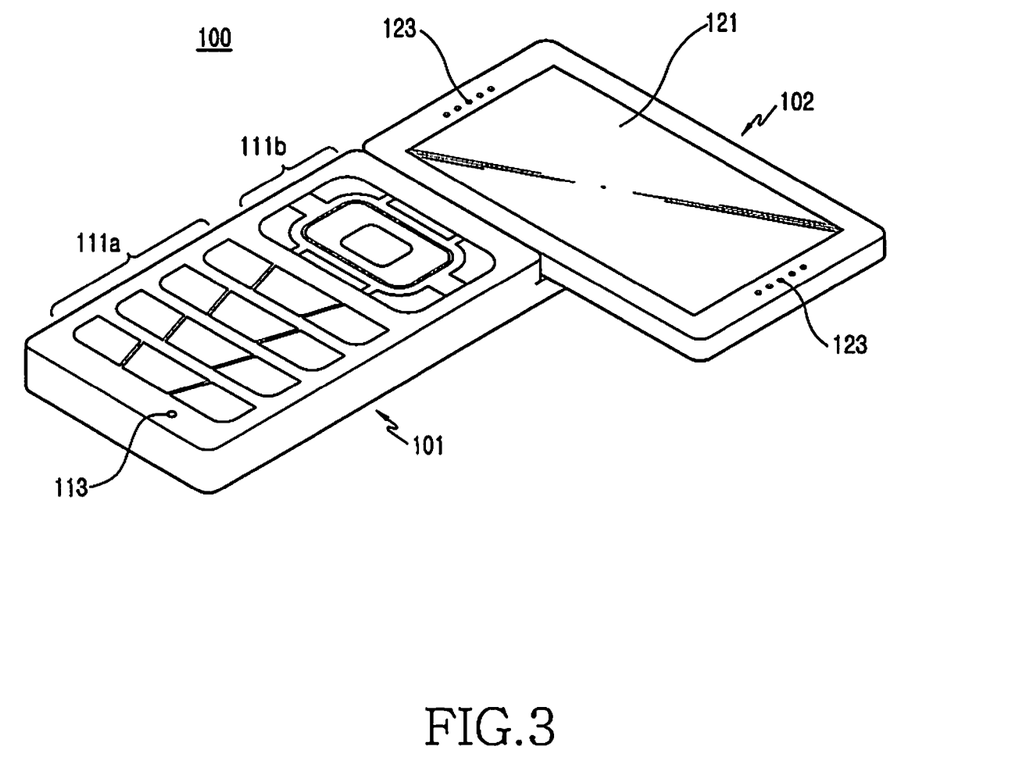
FIG. 3 is a perspective view showing a state of the portable terminal shown in FIG. 1 in which a second housing rotates 90° clockwise.
Figure 4:
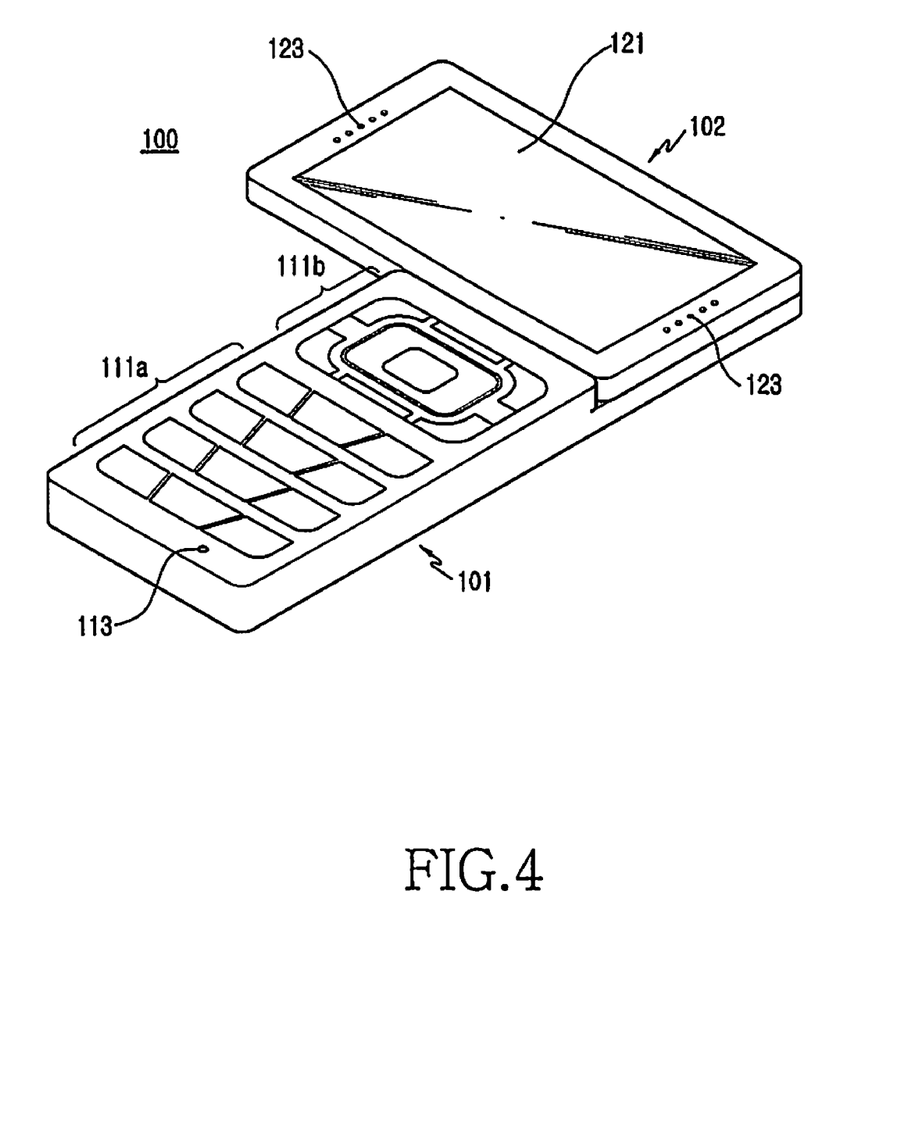
FIG. 4 is a perspective view showing a state of the portable terminal shown in FIG. 1 in which the second housing rotates 90° counterclockwise.

Referring to FIGS. 3 and 4, when the second housing 102 disposed in the longitudinal direction of the first housing 101 rotates 90° clockwise or counterclockwise, the display device 121 outputs a horizontally wide screen. Horizontally displayed screens on the display device 121 are upside-down with respect to each other according to opposite rotation directions. For example, if the display device 121 displays a normal screen after 90° clockwise rotation of the second housing 102, the display device 121 displays an upside-down screen after 90° counterclockwise rotation of the second housing 102. Thus, the portable terminal 100 has to reverse the upside-down screen according to the rotation direction of the second housing 102.

When the display device 121 outputs a horizontally wide screen, the portable terminal 100 is set to a mode that allows the user to view a moving picture of broadcasting. In this state, the display device 121 displays a played moving picture or a broadcasting screen. At this time, the speakers 123 are positioned horizontally at both sides of the display device 121 in order to output stereo sound or 3-Dimensional (3D) sound provided from a played moving picture file or broadcasting screen data.

Figure 5:
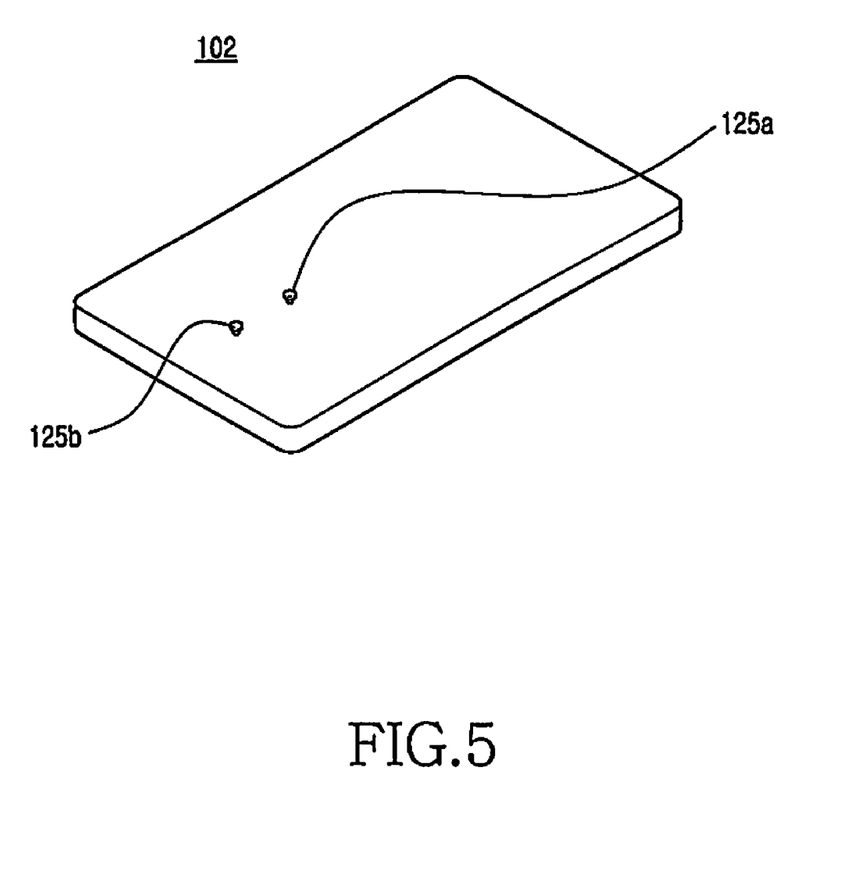
FIG. 5 is a perspective view of a back face of the second housing of the portable terminal shown in FIG. 1.

FIG. 5 is a perspective view of a back face of the second housing 102 of the portable terminal 100 shown in FIG. 1. As shown in FIG. 5, a first guide protrusion 125a and a second guide protrusion 125b are formed in the back face of the second housing 102. The first guide protrusion 125a and the second guide protrusion 125b are inserted into respectively a first guide groove 117a and a second guide groove 117b that are formed in the mounting unit 115 in order to rotatably combine the second housing 102 with the first housing 101.

The first guide protrusion 125a provides a rotation axis for the second housing 102 and moves linearly on the mounting unit 115 during the rotation of the second housing 102. The first guide groove 117a extends along the longitudinal direction of the first housing 101 in order to provide a path along which the first guide protrusion 125a moves linearly. In other words, the first guide protrusion 125a provides a rotation axis for the second housing 102 while linearly moving within the first guide groove 117a.

The second guide protrusion 125b is disposed apart from the first guide protrusion 125a and moves on the mounting unit 115 while forming a predetermined curved locus during the rotation of the second housing 102. The second guide grove 117b is formed along the moving locus of the second guide protrusion 125b and is spaced apart from the first guide groove 117a. The midpoint of the second guide groove 117b is adjacent to the sidewall of the mounting unit 115 and aligned with the first guide groove 125a, and the second guide groove 117b extends to both directions from its midpoint, thus being symmetrical with respect to a longitudinal center line of the first housing 101.

When the second housing 102 is in a longitudinal position in which the second housing 102 is longitudinally aligned with the first housing 101, the first guide protrusion 125a is disposed in a lower portion of the first guide groove 117a and the second guide protrusion 125b is disposed in the midpoint of the second guide groove 117b. From this longitudinal position, upon clockwise rotation of the second housing 102, the first guide protrusion 125a moves from the lower portion to an upper portion of the first guide groove 117a and the second guide protrusion 125b moves from the midpoint towards a left portion of the second guide groove 117b. Upon counterclockwise rotation of the second housing 102 from the longitudinal position, the first guide protrusion 125a moves in the same manner as in the clockwise rotation of the second housing 102, but the second guide protrusion 125b moves from the midpoint towards a right end of the second guide groove 117b. Upon 90° clockwise or counterclockwise rotation of the second housing 102 from the longitudinal position, the second guide protrusion 125b is disposed at one of two ends of the second guide groove 117b.

A driving unit 103 for providing a driving force for rotating the second housing 102 is included between the first housing 101 and the second housing 102. The driving unit 103 includes a first elastic body 131 and a second elastic body 133 in order to provide elastic forces for urging both ends of each of the first elastic body 131 and the second elastic body 133 away from each other. Each of the first elastic body 131 and the second elastic body 133 includes a torsion spring that is wound at least once. In order to dispose the first elastic body 131 and the second elastic body 133 between the first housing 101 and the second housing 102, a first fixing protrusion 119a and a second fixing protrusion 119b are formed in the mounting unit 115. The first fixing protrusion 119a protrudes in adjacent to a top end of the first guide prove 117a and the second fixing protrusion 119b protrudes between a bottom end of the first guide groove 117a and the second guide groove 117b.

One end of the first elastic body 131 is supported in the first guide protrusion 125a and the other end of the first elastic body 131 is supported in the first fixing protrusion 119a. One end of the second elastic body 133 is supported in the second guide protrusion 125b and the other end of the second elastic body 133 is supported in the second fixing protrusion 119b.

In the longitudinal position, the first fixing protrusion 119a, the first guide protrusion 125a, the second fixing protrusion 119b, and the second guide protrusion 125b are sequentially arranged in alignment with one another. At this time, the first elastic body 133 and the second elastic body 133 provide elastic forces for urging the both ends away from each other, thereby causing the lower cross-section of the second housing 102 to closely contact the sidewall of the mounting unit 115.

Upon clockwise or counterclockwise rotation of the second housing 102 from the longitudinal position, the first guide protrusion 125a and the second guide protrusion 125b move along the first guide groove 117a and the second guide groove 117b, respectively. One end of each of the first elastic body 131 and the second elastic body 133 gradually moves towards the other end of each of the first elastic body 131 and the second elastic body 133. Due to the rotation of the second housing 102, both ends of the first elastic body 131 move towards each other and so do both ends of the second elastic body 133, thereby accumulating elastic forces for urging the both ends away from each other. When the both ends of each of the first elastic body 131 and the second elastic body 133 pass their closest point, the second housing 102 rotates in a rotation direction by being provided with the elastic forces from the first elastic body 131 and the second elastic body 133. Once the second housing 102 rotates 90° in the rotation direction, the second guide protrusion 125b is positioned in one of the two ends of the second guide groove 117b. The first elastic body 131 and the second elastic body 133 provide forces for causing one of the two side faces of the second housing 102 to closely contact the sidewall of the mounting unit 115 and maintain the lower cross-section of the second housing 102 in the same plane as one of two side faces of the first housing 101.

Figure 6:
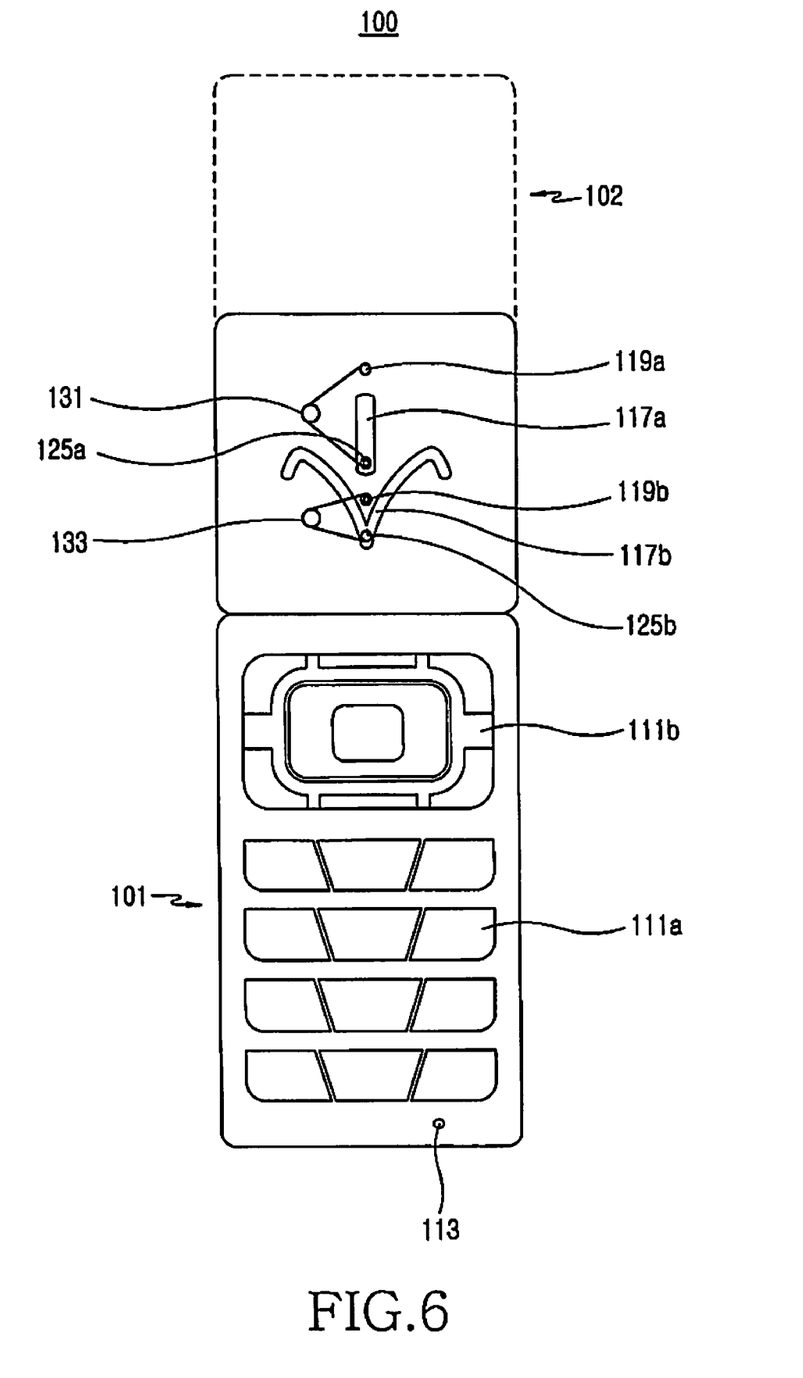
FIG. 6 shows a state of the portable terminal shown in FIG. 1 in which the second housing is combined with a first housing.
Figure 7:
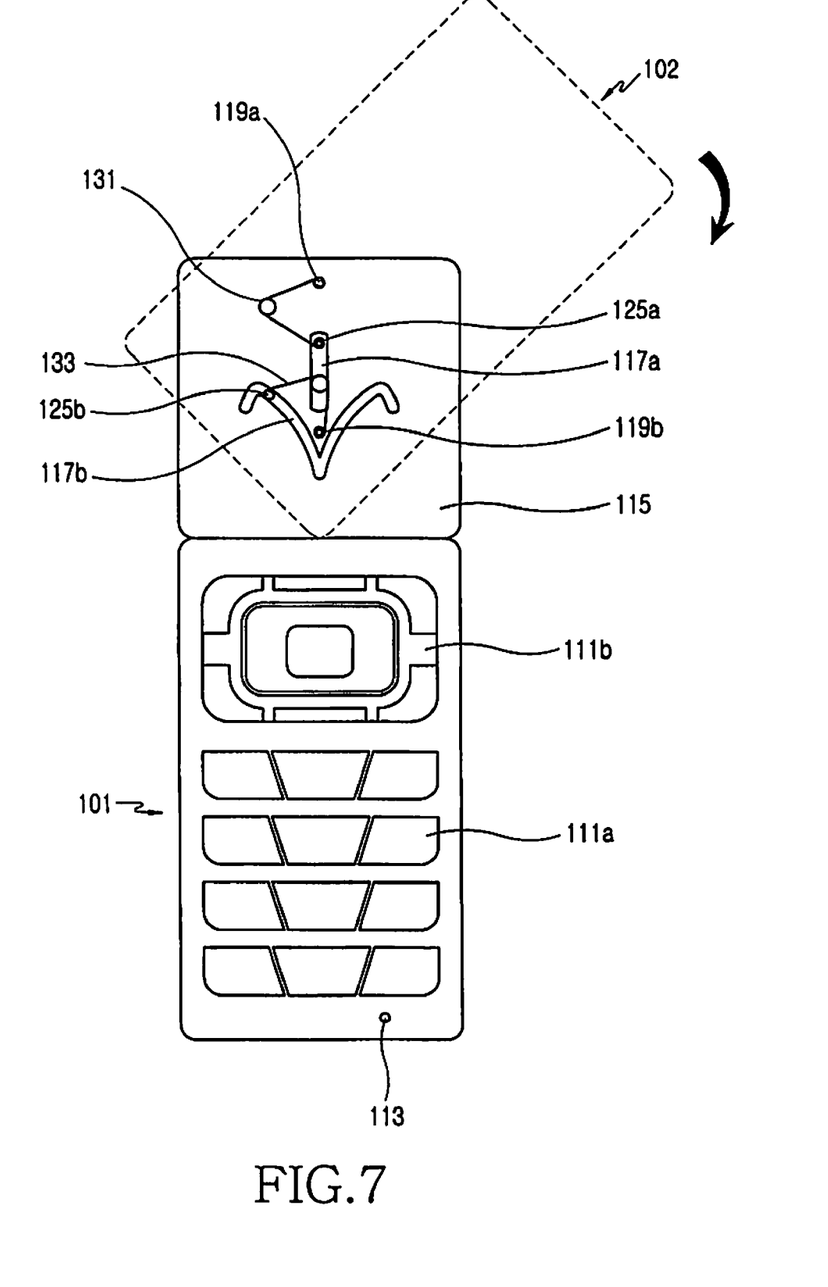
FIG. 7 shows a state of the portable terminal shown in FIG. 6 in which the second housing is rotating clockwise from its longitudinal position.
Figure 8:
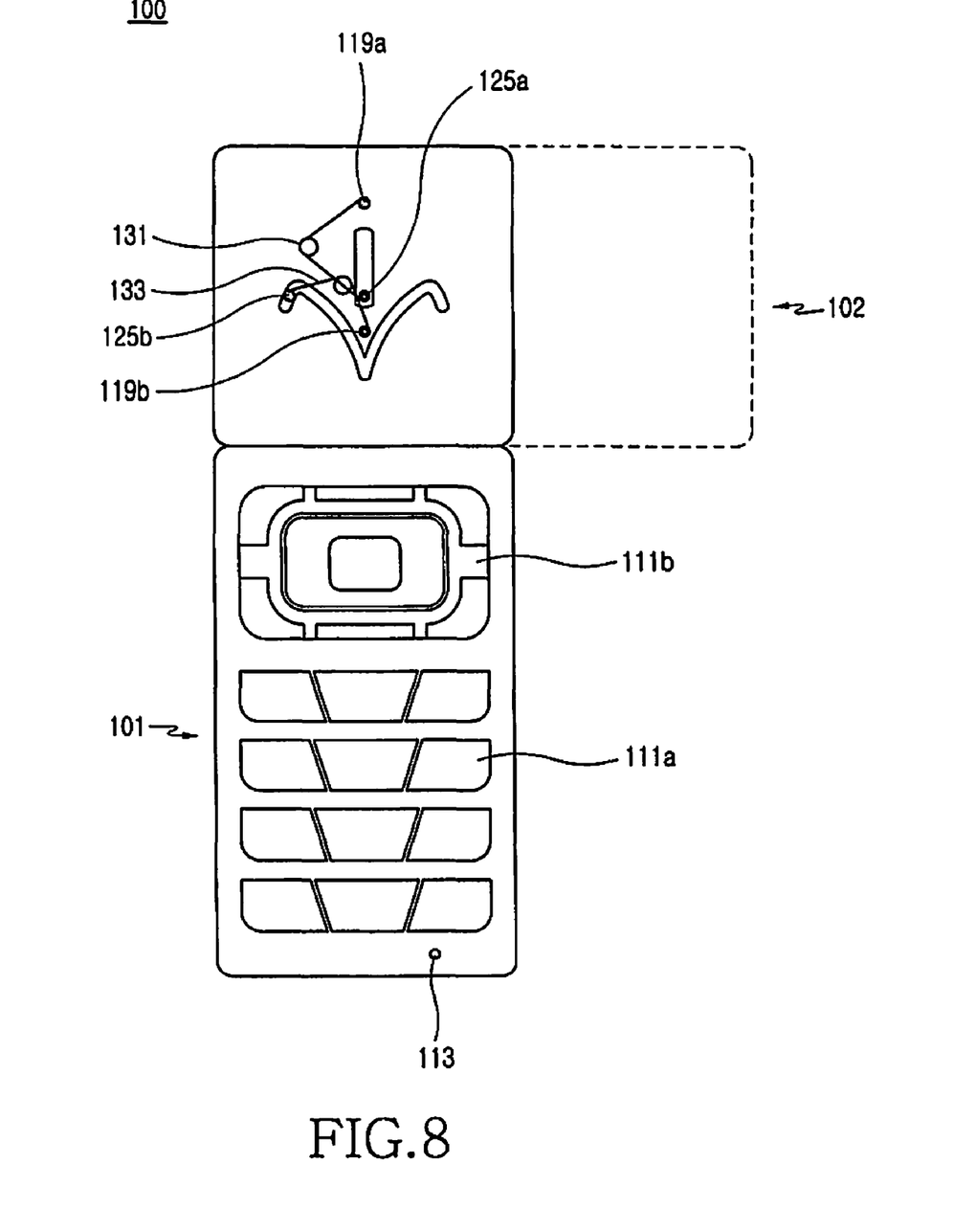
FIG. 8 shows a state of the portable terminal shown in FIG. 6 in which the second housing rotates 90° clockwise from its longitudinal position.

FIG. 6 shows a state of the portable terminal 100 shown in FIG. 1 in which the second housing 102 is longitudinally aligned with the first housing 101, FIG. 7 shows a state of the portable terminal 100 shown in FIG. 6 in which the second housing 102 is rotating clockwise, and FIG. 8 shows a state of the portable terminal 100 shown in FIG. 6 in which the second housing 102 rotates 90° clockwise. Hereinafter, 90° clockwise rotation of the second housing 102 from the longitudinal position will be described with reference to FIGS. 6 through 8.

When the second housing 102 is in the longitudinal state, the first guide protrusion 125a is positioned in the lower portion of the first guide groove 117a and the second guide protrusion 125b is positioned in the midpoint of the second guide groove 117b. In this longitudinal position, the lower cross-section of the second housing 102 is provided with elastic forces of the first elastic body 131 and the second elastic body 133, thus being maintained in close contact with the sidewall of the mounting unit 115. In this way, the second housing 102 can remain stable.

Upon clockwise rotation of the second housing 102, the first guide protrusion 125a moves from the lower portion of the first guide groove 117a to the upper portion of the first guide groove 117a and the second guide protrusion 125b moves from the midpoint of the second guide groove 117b towards the left end of the second guide groove 117b, thus gradually moving towards the second fixing protrusion 119b. With the movement of the first guide protrusion 125a and the second guide protrusion 125b, both ends of the first elastic body 131 gradually move towards each other and so do both ends of the second elastic body 133, thus accumulating elastic forces. A corner formed by the lower cross-section of the second housing 102 and a right side face of the second housing 102 linearly moves in adjacent to the sidewall of the mounting unit 115 or slides while contacting the sidewall of the mounting unit 115.

When the second housing 102 continues rotating clockwise, both ends of the first elastic body 131 pass their closest point and so do both ends of the second elastic body 133. After the passing the closest points, elastic forces accumulated in the first elastic body 131 and the second elastic body 133 urge respectively the first guide protrusion 125a from the upper portion of the first guide groove 117a to the lower portion of the first guide groove 117a and the second guide protrusion 125b towards the left end of the second guide groove 117b. In other words, once both ends of each of the first elastic body 131 and the second elastic body 133 pass their respective closest point, the second housing 102 is provided with elastic forces from the first elastic body 131 and the second elastic body 133, thus rotating in the ongoing rotation direction, i.e., now in the clockwise direction.

When the second housing 102 rotates by being provided with the elastic forces from the first elastic body 131 and the second elastic body 133, its lower cross-section is urged away from the sidewall of the mounting unit 115 and its right side face is urged towards the sidewall of the mounting unit 115. Thus, once the right side face of the second housing 102 closely contacts the sidewall of the mounting unit 115, the second housing 102 does not rotate any more and is stopped in a 90° clockwise-rotated position.

After the second housing 102 rotates 90° clockwise from the longitudinal position, the first guide protrusion 125a is positioned in the lower portion of the first guide groove 117a and the second guide protrusion 125b is positioned in the left end of the second guide groove 117b. In this position, the first elastic body 131 and the second elastic body 133 provide a force for causing the right side face of the second housing 102 to closely contact the sidewall of the mounting unit 115 and maintain the lower cross-section of the second housing 102 aligned with the left side face of the first housing 101. Thus, the second housing 102 maintains a clockwise position, which is 90°, clockwise rotated with respect to the longitudinal direction of the first housing 101.

After the second housing 102 rotates 90° clockwise from the longitudinal position, the display device 121 provides a screen that is wide along the latitudinal direction of the first housing 101. In the clockwise position, the user can conveniently use a multimedia service such as watching of moving pictures or broadcasting using the display device 121.

Figure 9:
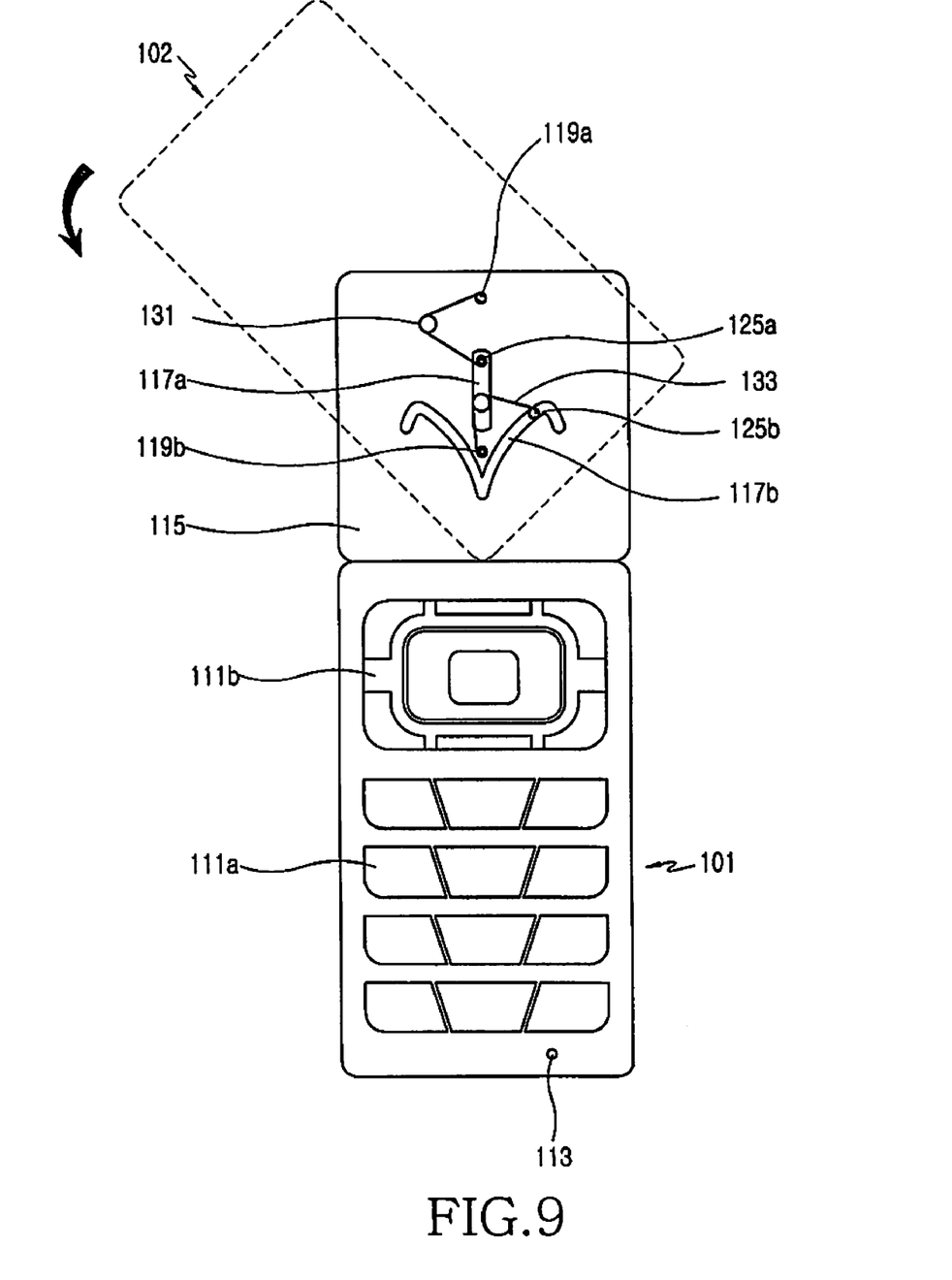
FIG. 9 shows a state of the portable terminal shown in FIG. 6 in which the second housing is rotating counterclockwise from its longitudinal position.
Figure 10:
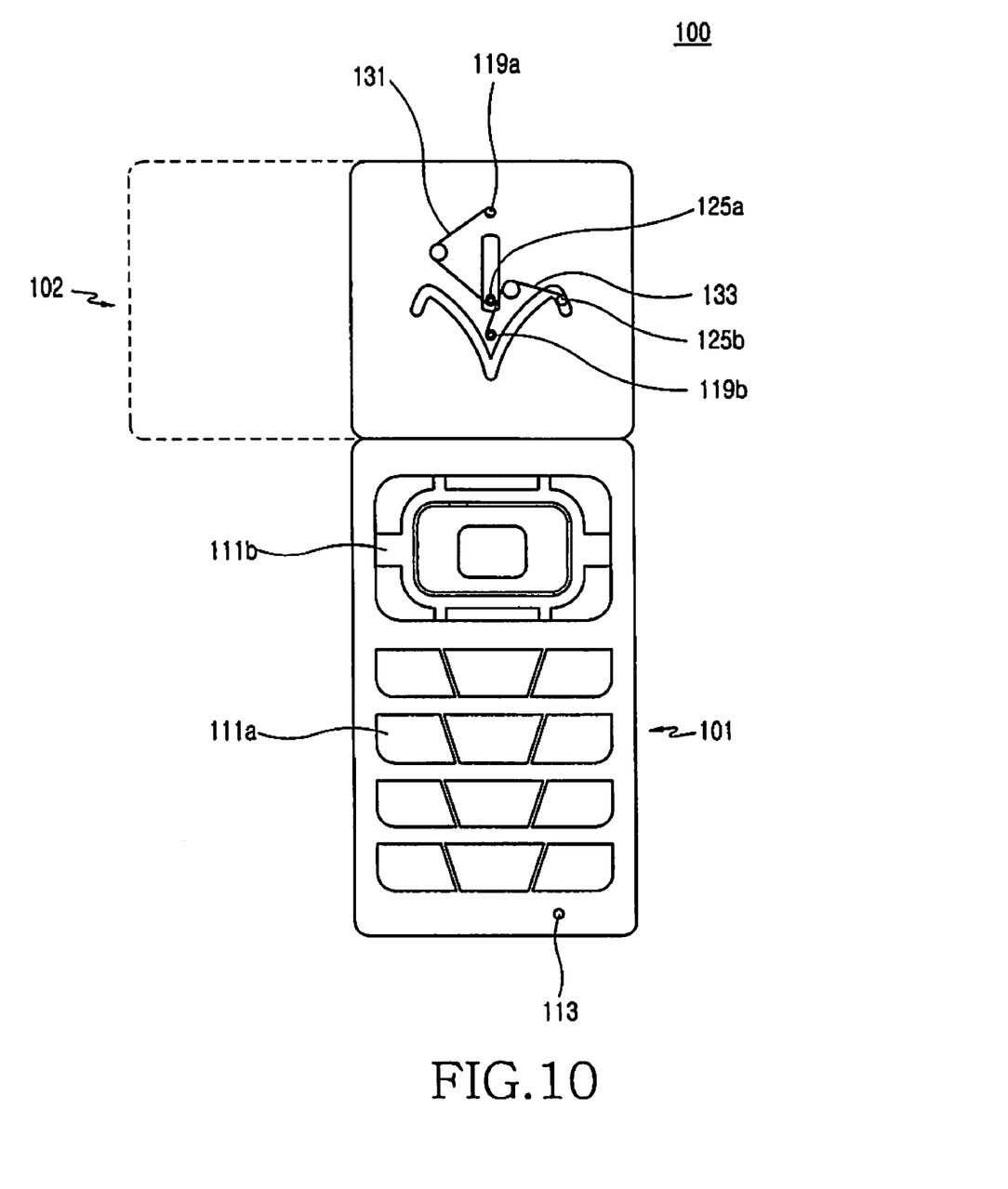
FIG. 10 shows a state of the portable terminal shown in FIG. 6 in which the second housing rotates 90° counterclockwise from its longitudinal position.

FIG. 9 shows a state of the portable terminal 100 shown in FIG. 6 in which the second housing 102 is rotating counterclockwise, and FIG. 10 shows a counterclockwise position of the portable terminal 100 shown in FIG. 6 in which the second housing 102 rotates 90° counterclockwise from the longitudinal position. Hereinafter, 90° counterclockwise rotation of the second housing 102 disposed in the longitudinal direction of the first housing 101 will be described with reference to FIGS. 6, 9, and 10.

Upon counterclockwise rotation of the second housing 102 from the longitudinal position, the first guide protrusion 125a moves from the lower portion of the first guide groove 117a towards the upper portion of the first guide groove 117a, and the second guide protrusion 125b moves from the midpoint of the second guide groove 117b towards the right end of the second guide groove 117b, thus gradually moving towards the second fixing protrusion 119b. With the movement of the first guide protrusion 125a and the second guide protrusion 125b, both ends of the first elastic body 131 gradually move towards each other and so do both ends of the second elastic body 133, thus accumulating elastic forces. A corner formed by the lower cross-section of the second housing 102 and a left side face of the second housing 102 linearly moves in adjacent to the sidewall of the mounting unit 115 or slides while contacting the sidewall of the mounting unit 115.

When the second housing 102 continues rotating counterclockwise, both ends of each of the first elastic body 131 and the second elastic body 133 pass their respective closest point. After the both ends pass their closest point, elastic forces accumulated in the first elastic body 131 and the second elastic body 133 urge respectively the first guide protrusion 125a from the upper portion of the first guide groove 117a to the lower portion of the first guide groove 117a and the second guide protrusion 125b towards the right end of the second guide groove 117b. In other words, once both ends of each of the first elastic body 131 and the second elastic body 133 pass their respective closest point, the second housing 102 is provided with elastic forces from the first elastic body 131 and the second elastic body 133, thus rotating in the ongoing rotation direction, i.e., now the counterclockwise direction.

When the second housing 102 rotates counterclockwise by being provided with the elastic forces from the first elastic body 131 and the second elastic body 133, its lower cross-section is urged away from the sidewall of the mounting unit 115 and its left side face is urged towards the sidewall of the mounting unit 115. Thus, once the left side face of the second housing 102 closely contacts the sidewall of the mounting unit 115, the second housing 102 does not rotate any more and is stopped in a 90° counterclockwise-rotated position.

When the second housing 102 rotates 90° counterclockwise from the first housing 101, the first guide protrusion 125a is positioned in the lower portion of the first guide groove 117a and the second guide protrusion 125b is positioned in the right end of the second guide groove 117b. In the counterclockwise position, the first elastic body 131 and the second elastic body 133 provide a force for causing the left side face of the second housing 102 to closely contact the sidewall of the mounting unit 115 and maintain the lower cross-section of the second housing 102 aligned with the right side face of the first housing 101. Thus, the second housing 102 maintains a 90° counterclockwise-rotated position with respect to the longitudinal position.

When the second housing 102 rotates 90° counterclockwise from the longitudinal position, the display device 121 provides a screen that is wide along the latitudinal direction of the first housing 101. In this state, the user can conveniently use a multimedia service such as watching of moving pictures or broadcasting using the display device 121.

As described above, in the portable terminal according to the present invention, the first housing and the second housing are combined with each other such that the second housing can rotate while facing the first housing, and the second housing can rotate selectively clockwise or counterclockwise when being longitudinally aligned with the first housing, thereby facilitating rotation of the second housing. The first guide protrusion, the second guide protrusion, the first guide groove, and the second guide groove are included in the first housing for rotation of the second housing, whereby the second housing moves towards the upper portion while rotating and one of corners of two side faces of the second housing linearly moves in adjacent to the sidewall of the mounting unit or slides while contacting the sidewall of the mounting unit. Thus, the shapes of the first housing and the second housing are maintained rectangular while enabling rotation of the display device, thereby sufficiently securing the size of the display device. Moreover, the driving unit is provided between the first housing and the second housing and the second housing can be semi-automatically rotated by elastic forces provided by the driving unit, thereby facilitating rotation of the second housing.

While the invention has been shown and described with reference to an exemplary embodiment thereof, it will be understood by those skilled in the art that various changes in form and details may be made therein without departing from the spirit and scope of the invention.

What is claimed is:

1. A portable terminal comprising:
    a first housing having a face in which a mounting unit is formed;
    a second housing combined with the mounting unit in order for the second housing to rotate while facing the first housing;
    a first guide protrusion protruding in a back face of the second housing in order to provide a rotation axis for the second housing; and
    a second guide protrusion spaced apart from the first guide protrusion and protruding in the back face of the second housing,
    wherein after a 90 ° rotation, of the second housing from a longitudinal position in which the second housing is longitudinally aligned with the first housing, in one of a clockwise and a counterclockwise direction, one of two side faces of the second housing closely contacts a sidewall of the mounting unit and a lower cross-section of the second housing is aligned with one of two side faces of the first housing.

2. The portable terminal of claim 1,
wherein after the 90° rotation of the second housing, the first guide protrusion moves linearly on the mounting unit and the second guide protrusion moves on the mounting unit while forming a curved locus.

3. The portable terminal of claim 2, wherein the mounting unit comprises:
   a first guide groove for providing a path along which the first guide protrusion moves linearly; and
   a second guide groove spaced apart from the first guide groove and formed on a trace along which the second guide protrusion moves,
   wherein the first guide protrusion and the second guide protrusion are inserted into the first guide groove and the second guide groove, respectively.

4. The portable terminal of claim 3, wherein the first guide groove extends along the longitudinal direction of the first housing.

5. The portable terminal of claim 4, wherein a midpoint of the second guide groove is disposed adjacent to the sidewall of the mounting unit and aligned with the first guide groove and the second guide groove extends to both directions from the midpoint, thus the second guide groove being symmetrical with respect to a longitudinal center line of the first housing.

6. The portable terminal of claim 5, wherein when the second housing is in the longitudinal position, the first guide protrusion is disposed in a lower portion of the first guide groove and the second guide protrusion is disposed in the midpoint of the second guide groove.

7. The portable terminal of claim 3, further comprising:
   a first fixing protrusion protruding adjacent to one end of the first guide groove; and
   a second fixing protrusion protruding between the second guide groove and an other end of the first guide groove,
   wherein when the second housing is in the longitudinal position, the first fixing protrusion, the first guide protrusion, the second fixing protrusion, and the second guide protrusion are sequentially and longitudinally aligned.

8. The portable terminal of claim 7, wherein after the 90° rotation of the second housing from the longitudinal position, the second guide protrusion is disposed in one of two ends of the second guide groove.

9. The portable terminal of claim 7, further comprising a driving unit disposed between the first housing and the second housing, the driving unit providing an elastic force for urging both ends of the driving unit away from each other.

10. The portable terminal of claim 9, wherein the driving unit comprises:
    a first elastic body having one end supported in the first guide protrusion and an other end supported in the first fixing protrusion; and
    a second elastic body having one end supported in the second guide protrusion and an other end supported in the second fixing protrusion,
    wherein during the 90° rotation of the second housing, the one end of each of the first elastic body and the second elastic body moves towards the respective other end and then moves away from the respective other end.

11. The portable terminal of claim 10, wherein the first elastic body and the second elastic body provide the elastic force after both ends of each of the first elastic body and the second elastic body pass a closest point where the both ends are closest to each other.

12. The portable terminal of claim 9, wherein when the second housing is in the longitudinal position, the elastic force causes the lower cross-section of the second housing to closely contact the sidewall of the mounting unit.

13. The portable terminal of claim 9, wherein after the 90° rotation of the second housing from the longitudinal position, the elastic force causes one of the two side faces of the second housing to closely contact the sidewall of the mounting unit and the lower cross-section of the second housing to be aligned with one of the two side faces of the first housing.

14. The portable terminal of claim 1, wherein the sidewall of the mounting unit is planar and one of two corners, each of the two corners is between the lower cross-section and one of the two side faces of the second housing, slides while contacting the sidewall during the 90° rotation of the second housing.

15. The portable terminal of claim 1, wherein the second housing comprises:
    a display device installed in one face of the second housing; and
    a plurality of speakers installed at both sides of the display device.

16. The portable terminal of claim 15, wherein the display device is selectively presented by one of a vertically long screen and a horizontally wide screen.

17. The portable terminal of claim 1, wherein the first housing comprises:
    a keypad installed in one face of the first housing; and
    a microphone installed adjacent to the keypad.

* * * * *